United States Patent
Choi et al.

(10) Patent No.: US 8,855,819 B2
(45) Date of Patent: Oct. 7, 2014

(54) METHOD AND APPARATUS FOR SIMULTANEOUS LOCALIZATION AND MAPPING OF ROBOT

(75) Inventors: Ki-wan Choi, Anyang-si (KR); Hyoung-ki Lee, Seongam-si (KR); Ji-young Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 684 days.

(21) Appl. No.: 12/458,786

(22) Filed: Jul. 22, 2009

(65) Prior Publication Data

US 2010/0094460 A1 Apr. 15, 2010

(30) Foreign Application Priority Data

Oct. 9, 2008 (KR) .................. 10-2008-0099128
Jan. 21, 2009 (KR) .................. 10-2009-0005058

(51) Int. Cl.
G05B 19/04 (2006.01)
G05B 19/18 (2006.01)
G05D 1/02 (2006.01)
B25J 9/16 (2006.01)

(52) U.S. Cl.
CPC ....... *B25J 9/1692* (2013.01); *G05D 2201/0203* (2013.01); *G05D 1/0246* (2013.01); *G05B 2219/39388* (2013.01); *G06T 2207/30252* (2013.01); *G06T 2207/20076* (2013.01); *G05D 1/0274* (2013.01); *G06T 2207/30244* (2013.01); *G05B 2219/37563* (2013.01)
USPC ...... 700/251; 700/259; 318/568.19; 382/153; 382/154; 382/190; 382/201; 382/285

(58) Field of Classification Search
USPC ............. 700/251, 259; 702/152; 318/568.12, 318/568.19; 382/153, 154, 190, 201, 285; 345/419

See application file for complete search history.

(56) References Cited

U.S. PATENT DOCUMENTS

| 5,819,016 | A | * | 10/1998 | Watanabe et al. ............. 345/419 |
| 6,384,859 | B1 | * | 5/2002 | Matsumoto et al. ........... 348/43 |
| 6,732,826 | B2 | | 5/2004 | Song et al. |
| 7,660,444 | B2 | * | 2/2010 | Hamalainen .................. 382/118 |
| 7,774,158 | B2 | * | 8/2010 | Domingues Goncalves et al. ............................ 702/152 |
| 7,912,583 | B2 | * | 3/2011 | Gutmann et al. ............. 700/245 |

(Continued)

FOREIGN PATENT DOCUMENTS

| JP | 59-142664 | 8/1984 |
| JP | 63-134912 | 6/1988 |

(Continued)

OTHER PUBLICATIONS

Chen et al., Implementation of an Update Scheme for Monocular Visual SLAM, 2006, ICIA 2006, IEEE, pp. 212-217.*

(Continued)

*Primary Examiner* — Khoi Tran
*Assistant Examiner* — Jaime Figueroa
(74) *Attorney, Agent, or Firm* — Staas & Halsey LLP

(57) ABSTRACT

A SLAM of a robot is provided. The position of a robot and the position of feature data may be estimated by acquiring an image of the robot's surroundings, extracting feature data from the image, and matching the extracted feature data with registered feature data. Furthermore, measurement update is performed in a camera coordinate system and an appropriate assumption is added upon coordinate conversion, thereby reducing non-linear components and thus improving the SLAM performance.

15 Claims, 6 Drawing Sheets

(56) References Cited

U.S. PATENT DOCUMENTS

| | | | |
|---|---|---|---|
| 7,925,049 B2* | 4/2011 | Zhu et al. | 382/103 |
| 7,932,913 B2* | 4/2011 | Ishiyama | 345/582 |
| 8,059,889 B2* | 11/2011 | Kobayashi et al. | 382/154 |
| 2003/0030398 A1* | 2/2003 | Jacobs et al. | 318/568.12 |
| 2004/0168148 A1* | 8/2004 | Goncalves et al. | 717/104 |
| 2004/0202351 A1 | 10/2004 | Park et al. | |
| 2006/0143020 A1* | 6/2006 | Zaima | 705/1 |
| 2007/0003134 A1* | 1/2007 | Song et al. | 382/154 |
| 2007/0052698 A1* | 3/2007 | Funayama et al. | 345/419 |
| 2007/0090973 A1* | 4/2007 | Karlsson et al. | 340/995.22 |
| 2007/0146232 A1* | 6/2007 | Redert et al. | 345/6 |
| 2008/0247668 A1* | 10/2008 | Li et al. | 382/285 |
| 2008/0304707 A1* | 12/2008 | Ol et al. | 382/103 |
| 2009/0161989 A1* | 6/2009 | Sim | 382/285 |
| 2009/0167761 A1* | 7/2009 | Hayashi et al. | 345/424 |

FOREIGN PATENT DOCUMENTS

| | | |
|---|---|---|
| JP | 02-064784 | 3/1990 |
| JP | 2005-028468 | 2/2005 |
| KR | 10-2002-0081035 | 10/2002 |
| KR | 10-2004-0045572 | 6/2004 |
| KR | 10-2007-0108815 | 11/2007 |

OTHER PUBLICATIONS

Davison, Andrew J., Real-Time Simultaneous Localisation and Mapping with a Single Camera, 2003, Proceedings of the Ninth IEEE International Conference on Computer Vision (ICCV'03), pp. 1-8.*

Huang et al., Online SLAM in Dynamic Environments, 2005, Advanced Robotics, 2005. ICAR '05, Proceedings 12th International Conference, pp. 262-267.*

Davison et al., MonoSLAM: Real-Time Single Camera SLAM, 2007, IEEE Transactions on Pattern Analysis and Machine Intelligence, vol. 29, No. 6, Jun. 2007, pp. 1052-1067.*

Davison et al., Simultaneous Localization and Map-Building Using Active Vision, 2002, IEEE Transactions on Pattern Analysis and Machine Intelligence, vol. 24, No. 7, Jul. 2002, pp. 865-880.*

Tomono, Masahiro, Building an Object Map for Mobile Robots using LRF Scan Matching and Vision-based Object Recognition, 2004, Proceedings of the 2004IEEE Internationbal Conference on Robotics & Automation, New Orleans, LA—Apr. 2004, pp. 3765-3770.*

Zhang et al., Robot-Assisted Intelligent 3D Mapping of Unknown Cluttered Search and Rescue Environments, 2008 IEEE/RSJ International Conference on Intelligent Robots and Systems Acropolis Convention Center, Nice, France, Sep. 22-26, 2008, pp. 2115-2120.*

Civera et al., Inverse Depth Parametrization for Monocular SLAM, 2008, IEEE Transactions on Robotics, vol. 24, No. 5, Oct. 2008, pp. 932-945.*

Montiel et al., A Visual Compass based on SLAM, May 2006, Proceedings of the 2006 IEEE International Conference on Robotics and Automation, Orlando, Florida, pp. 1917-1922.*

Montiel et al., Unified Inverse Depth Parametrization for Monocular SLAM, Aug. 2006, Proceedings of Robotics Science and Systems, Philadelphia, USA, pp. 1-8.*

Smith, Paul et al., "Real-Time Monocular SLAM with Straight Lines," Department of Engineering Science, University of Oxford, UK and Department of Computing, Imperial College London, UK. [pas,ian]@robots.ox.ac.uk,ajd@doc.ic.uk, Sep. 2006.

Gee, Andrew P. et al., "Real-Time Model-Based SLAM Using Line Segments," Department of Computer Science, University of Bristol, UK. {gee,mayo} @cs.bris.ac.uk, Nov. 2006.

Lemaire, Thomas et al., "Monocular-vision based SLAM using line segments " LAAS-CNRS, Toulouse, France {thomas.lemarie, simon.lacroix}@ laas.fr, Apr. 2007.

Eade, Ethan et al., "Edge Landmarks in Monocular SLAM," Cambrige University, {ee231, twd20}@cam.ac.uk, Sep. 2006.

* cited by examiner

METHOD AND APPARATUS FOR SIMULTANEOUS LOCALIZATION AND MAPPING OF ROBOT

CROSS-REFERENCE TO RELATED APPLICATIONS

This application claims the benefit under 35 U.S.C. §119(a) of Korean Patent Applications No. 10-2008-99128, filed on Oct. 9, 2008, and No. 10-2009-5058, filed on Jan. 21, 2009, the disclosures of which are incorporated herein by reference in their entirety for all purposes.

BACKGROUND

1. Field

One or more embodiments set forth in the following description relate to simultaneous localization and mapping (SLAM) which is a technique used by robots and, more particularly, to measurement updates of SLAM.

2. Description of the Related Art

A robot is a machine which looks like a human being and performs various complex acts of a human being. Nowadays, the term robot generally refers to an entity which is programmed to move and perform certain tasks autonomously.

In particular, mobile robots can perform tasks in place of a human being in an extreme situation or a dangerous region. Home appliance robots, such as a robot cleaner, have also been popularized.

The mobile robot typically desires a localization and mapping algorithm to move and perform certain tasks autonomously. Simultaneous localization and mapping (SLAM) is an exemplary localization and mapping technique used by robots to build up a map within an unknown environment while at the same time keeping track of their current position.

SLAM can use many different types of sensors to acquire data used in building the map. Since the data from such sensors may contain errors, SLAM involves recursive data processing to obtain more reliable values based on the data from the sensors. For instance, SLAM reduces errors in positions of a robot or errors in acquired data through measurement updates.

The measurement updates update a calculated value in a previous step by comparing a measured value with the calculated value. The comparison between the measured value and the calculated value is typically performed in a two-dimensional space. Accordingly, SLAM involves a conversion operation from three-dimensional data about positions of a robot and the environment surrounding the robot in a three dimensional space into two-dimensional data in a two-dimensional space. However, since the conversion process includes a number of non-linear components, the operation slows down the overall processing speed, resulting in the SLAM performance being deteriorated.

SUMMARY

One or more embodiments set forth in the following description relate to an improved method and apparatus for SLAM through a measurement update in a three-dimensional coordinate system.

In one or more embodiments, a simultaneous localization and mapping (SLAM) apparatus of a robot includes a converter to convert a two-dimensional (2D) position of measured feature data to a three-dimensional (3D) position, and an updater to update registered feature data by comparing the 3D position of the measured feature data with a 3D position of the registered feature data.

In another one or more embodiments, a SLAM method of a robot includes converting a two-dimensional (2D) position of measured feature data to a three-dimensional (3D) position, and updating registered feature data by comparing the 3D position of the measured feature data with a 3D position of the registered feature data.

The conversion may be a coordinate conversion from an image coordinate system to a camera coordinate system. For example, a 2D position in an image coordinate system may be converted to a 3D position in a camera coordinate system.

The measurement update may be performed in the camera coordinate system.

The feature data may be a feature point or a feature line.

In the case where the feature data is a feature point, upon coordinate conversion, a depth of the feature point may be set to a predetermined value and an error covariance in the depth direction may be set to infinity.

In the case where the feature data is a feature line, a depth of each end point may be set to a predetermined value and an error covariance in the depth direction and an error covariance in a direction parallel to the feature line may be set to infinity.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
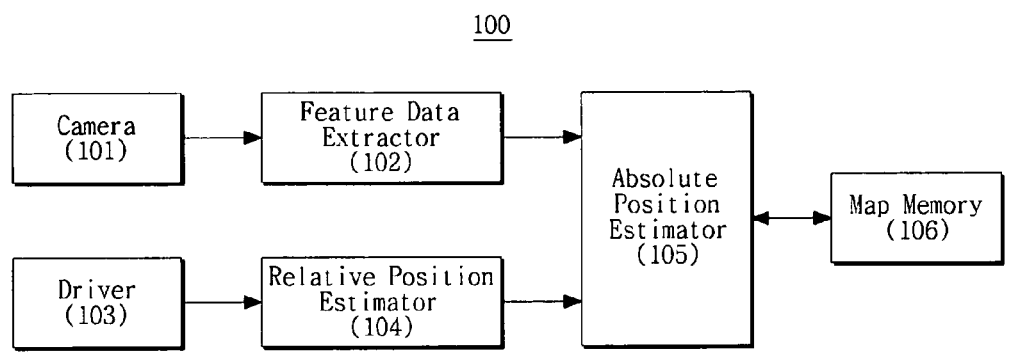
FIG. 1 is a block diagram of a SLAM apparatus in a robot according to an exemplary embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of a simultaneous localization and mapping (SLAM) apparatus 100 according to an exemplary embodiment of the present invention. Herein, throughout the following description, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing elements. As only another example, a respective apparatus/system or method could also be controlled through one or more processing elements/devices or implemented by a distributed network, noting that additional and alternative embodiments are equally available.

A SLAM apparatus 100 includes a camera 101, a feature data extractor 102, a driver 103, a relative position estimator 104, an absolute position estimator 105, and a map memory 106.

The camera 101 detects light reflected from a subject and converts the light to a digital signal to acquire an image of its surroundings. The camera 101 may include a charge coupled device (CCD) or complementary metal oxide semiconductor (CMOS) image sensor, and an image processing module which receives an output from the image sensor and creates a two-dimensional (2D) image. Accordingly, a robot can acquire an image of its surroundings while moving around a work space.

The feature data extractor 102 extracts feature data from the image acquired by the camera 101. Examples of the feature data include a feature point or a feature line. For example, the feature data extractor 102 may extract a specific "point" using the Harris corner detection technique, or a specific "line" using the Canny edge detection technique. When feature lines are extracted, both end points of straight lines may be extracted while curved lines are discarded.

The driver 103 which drives a robot may include a wheel, a steering unit, and a drive motor.

The relative position estimator 104 receives an output signal from the driver 103 and calculates a positional variation and a directional variation between a previous position of a robot and a current position of the robot. For example, the relative position estimator 104 estimates a current position of the robot by measuring and integrating a traveling distance of the robot from detected rotational motion of a wheel of the driver 103. The relative position estimator 104 may include an encoder, a gyro sensor, an acceleration sensor, and an operational module.

The absolute position estimator 105 calculates an absolute position of the robot using the relative position of the robot and feature data. The absolute position of the robot is determined from a relation between the robot and the feature data in a world coordinate system. Therefore, the calculation of the absolute position may be a process for obtaining the position of the robot and the position of the feature data in a world coordinate system.

For example, the absolute position estimator 105 matches feature data of an image acquired at a current position with feature data of an image acquired at a previous position and calculates absolute positions of a robot and feature data through measurement update. The feature data of an image acquired at a previous position may be stored as reference feature data in the map memory 106.

The matching may be a process for determining if there is any previously stored feature data in/for an image acquired at a current position. In a case of an unsuccessful matching, the feature data of the newly acquired image is stored as new reference feature data. On the contrary, in a case of a successful matching, the positions of the robot and feature data are updated through measurement update. Since sensing data typically contains error components, the measurement update enables previously calculated values to be more reliable.

The absolute position estimator 105 may employ a number of algorithms to perform data processing. The present embodiment may employ SLAM using extended Kalman filters.

Figure 2:
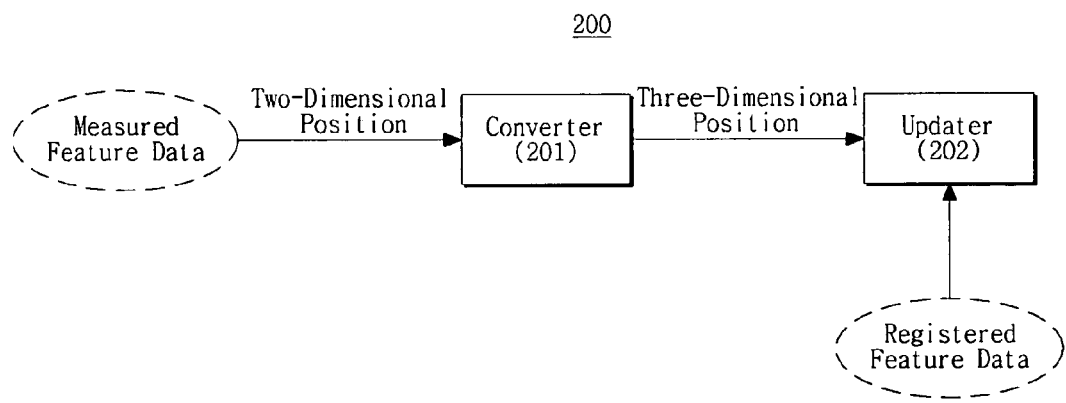
FIG. 2 is a block diagram of a measurement update unit of a SLAM apparatus in a robot according to an exemplary embodiment of the present invention.

FIG. 2 is a block diagram of a measurement update unit 200, which may be a configuration related to the measurement update of the absolute position estimator 105. In the present embodiment, the measurement update unit 200 updates feature data using measured feature data and stored feature data. The updating may be performed in a three-dimensional (3D) coordinate system. The 3D coordinate system may be a 3D coordinate system of the camera 101 (see FIG. 1).

In FIG. 2, the measurement update unit 200 may include a converter 201 and an updater 202.

The converter 201 converts a two-dimensional (2D) position of measured feature data to a three-dimensional (3D) position.

The measured feature data may be a feature point or a feature line of an image extracted from the feature data extractor 102. The 2D position may be a 2D coordinate in an image coordinate system with respect to the feature point or feature line. The 3D position may be a 3D coordinate in a camera coordinate system of the camera 101. The converter 201 converts the 2D position in the image coordinate system to the 3D position in the camera coordinate system.

When the converter 201 performs coordinate conversion, a depth may be set to a certain value and an error covariance in a depth direction may be set to infinity. If the feature data is a feature line, an error covariance in a direction parallel to the feature line may also be set to infinity. The term depth may indicate a direction perpendicular to a 2D image, i.e., a direction of the camera 101 to take an image.

The updater 202 updates registered feature data through a comparison between a converted 3D position of measured feature data and a 3D position of registered feature data. The registered feature data may be feature data which is extracted in a previous step, updated, and stored in the map memory 106. The updater 202 may employ various types of update algorithms such as an EKF update equation. The update algorithm may be performed in the camera coordinate system of the camera 101.

Coordinate systems for the measurement update will be described in detail with reference to FIG. 3.

Figure 3:
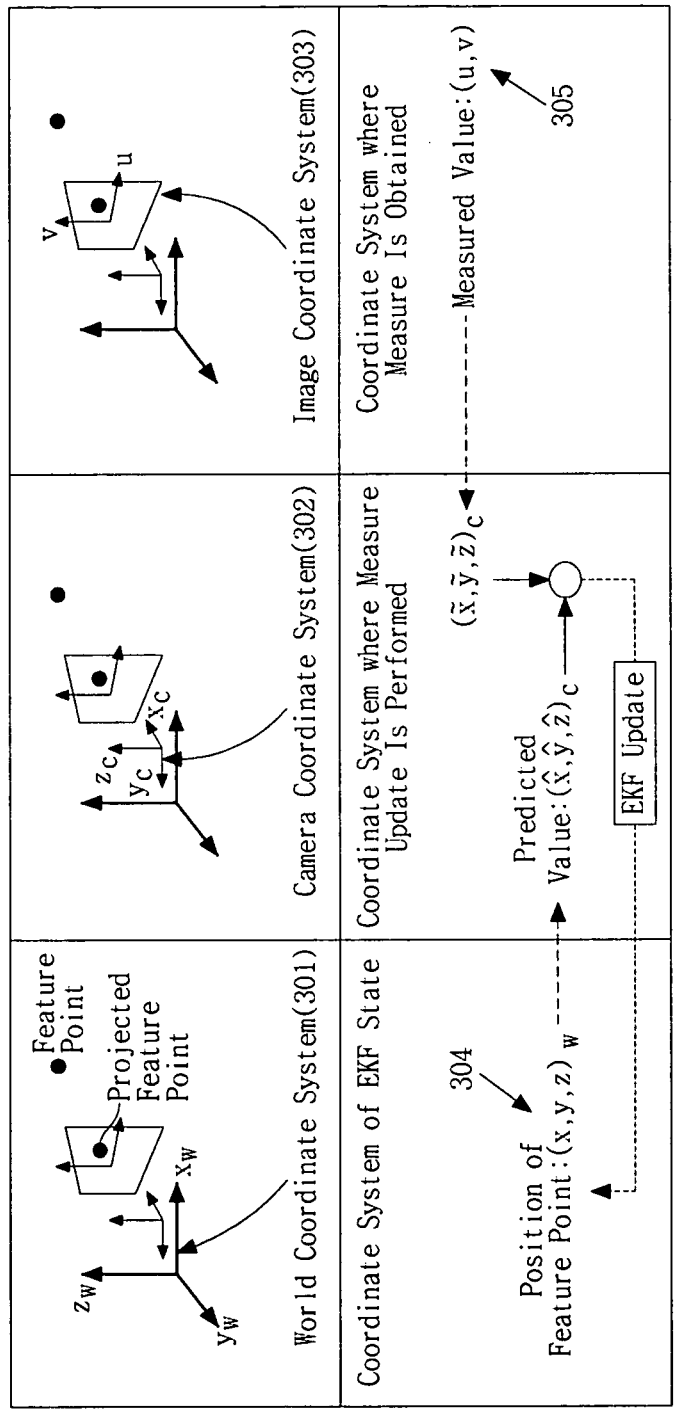
FIG. 3 illustrates coordinate systems according to an exemplary embodiment of the present invention.

In FIG. 3, reference numerals 301, 302 and 303 denote a world coordinate system, a camera coordinate system, and an image coordinate system, respectively. The world coordinate system 301 and the camera coordinate system 302 each represent a 3D space, and the image coordinate system 303 represents a 2D space. Reference numeral 304 represents registered feature data, i.e., feature data to be updated, and reference numeral 305 represents measured feature data. The registered feature data 304 may be a position in the world coordinate system, and the measured feature data 305 may be a position in the image coordinate system.

To perform the measurement update, the registered feature data 304 and the measured feature data 305 need to be subject to comparison and calculation in the same coordinate system. Therefore, the converter 201 converts the measured feature data 305 to corresponding data in the camera coordinate system 302.

The updater 202 updates originally stored feature data, i.e., feature data 305, by performing comparison and calculation of the registered feature data 304 and the measured feature data 305 in the camera coordinate system 302. Thus, the updater 202 may perform additional conversion from feature data in the world coordinate system 301 to feature data in the camera coordinate system 302. However, since the conversion is a process for converting 3D data to 3D data, the conversion is a simpler process compared to the conversion performed of the converter 201.

Accordingly, when the measurement update is performed in the camera coordinate system 302, non-linear components contained in the coordinate conversion are reduced since 3D data does not need to be converted to 2D data.

Figure 4:
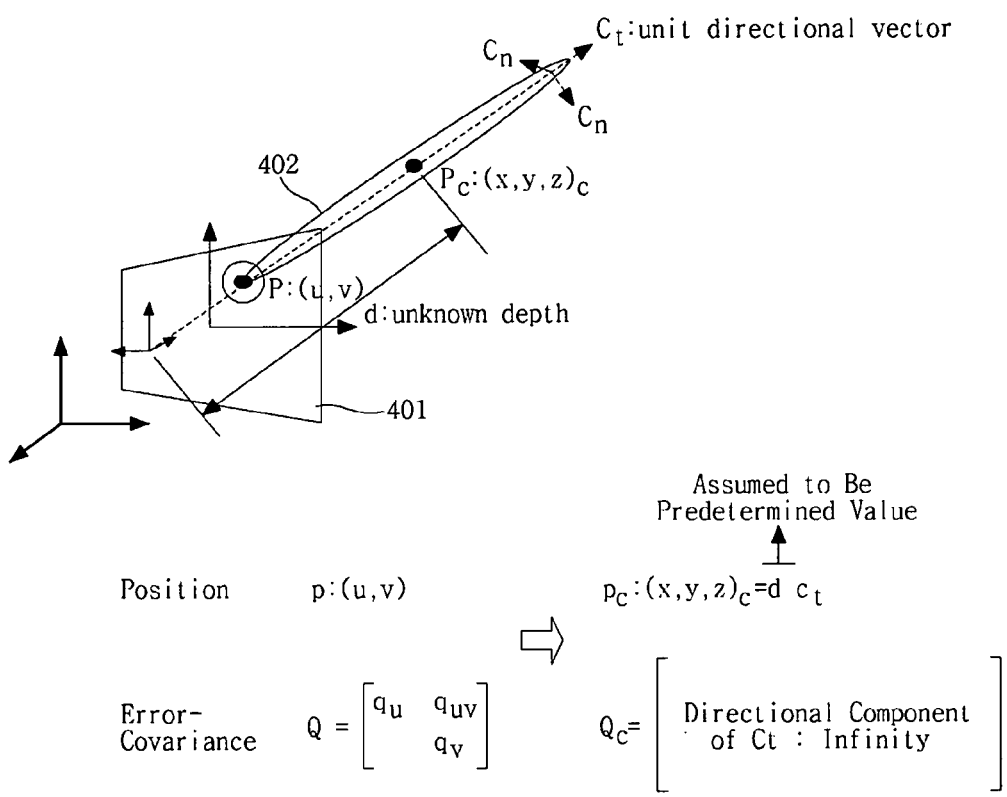
FIG. 4 illustrates a coordinate conversion process according to an exemplary embodiment of the present invention.

The conversion process of the converter 201 will be described in detail with reference to FIGS. 4 and 5. FIG. 4 may be an example where a feature point is used as feature data, and FIG. 5 may be an example where a feature line is used as feature data.

In FIG. 4, reference numeral 401 denotes an image acquired from the camera 101, and a point P denotes a feature point extracted from the acquired image. The position of P is represented as a coordinate (u, v) in the image coordinate system.

The converter 201 converts the 2D position of the point P, i.e., P:(u, v), to a 3D position of the point $P_c$:(x, y, z)$_c$. The subscript c indicates the camera coordinate system. Since position data in the direction perpendicular to the image, i.e., depth d, is unknown, the magnitude of directional vector of $c_t$ is set to a certain value.

Since the position of a feature point has a probabilistic value, the feature point has an error covariance at its position. The directional component of $c_t$ will have a very large error covariance. In FIG. 4, this is illustrated as an ellipse 402 with a long radius in a direction perpendicular to the image. At this time, the error covariance in the depth direction may be set to infinity.

Figure 5:
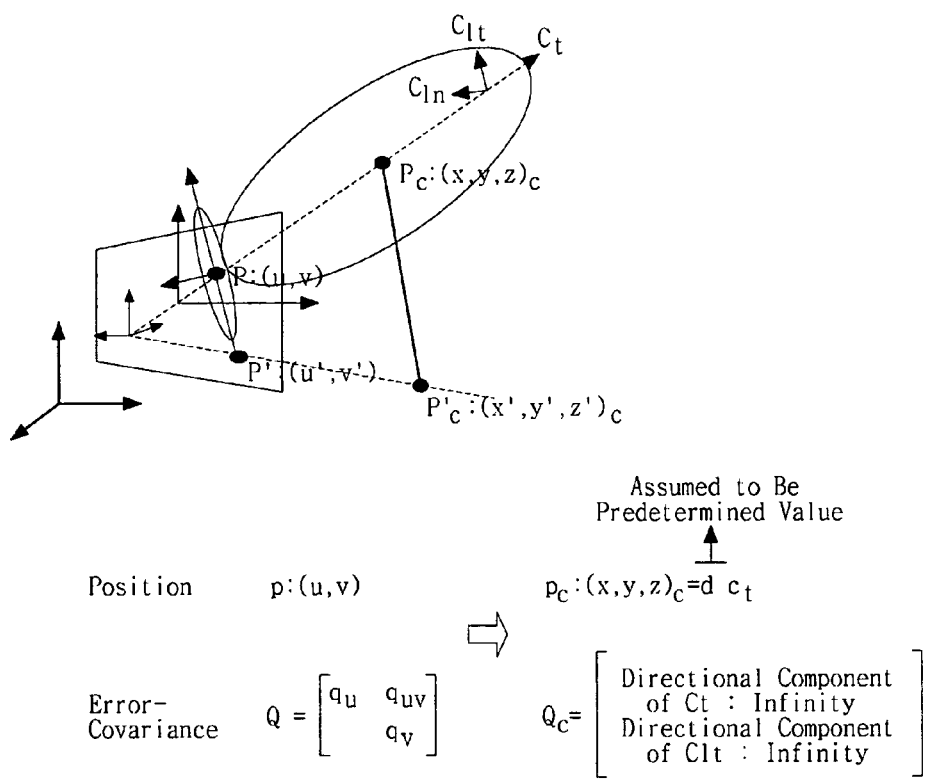
FIG. 5 illustrates a coordinate conversion process according to another exemplary embodiment of the present invention.

Referring FIG. 5, since a line is formed by joining two points together, a position of a feature line may be represented as positions of both end points of an extracted line.

A 2D position of the feature line is converted to a 3D position as described above with reference to FIG. 4. More specifically, the 2D position in the image coordinate system with respect to each point (e.g., P or P') is converted to the 3D position in the camera coordinate system (e.g., $P_c$ or $P'_c$). At this time, the magnitude of the depth d is set to a certain value and the error covariance in the depth direction is set to infinity.

The error covariance with respect to the direction parallel to the straight line, i.e., directional component of $c_{lt}$, may also be set to infinity. The feature line is represented by two different points, preferably both defined end points, of the straight line. However, the measurement update may also be performed with any two points on the straight line if the error covariance in the direction parallel to the straight line is set to infinity.

Figure 6:
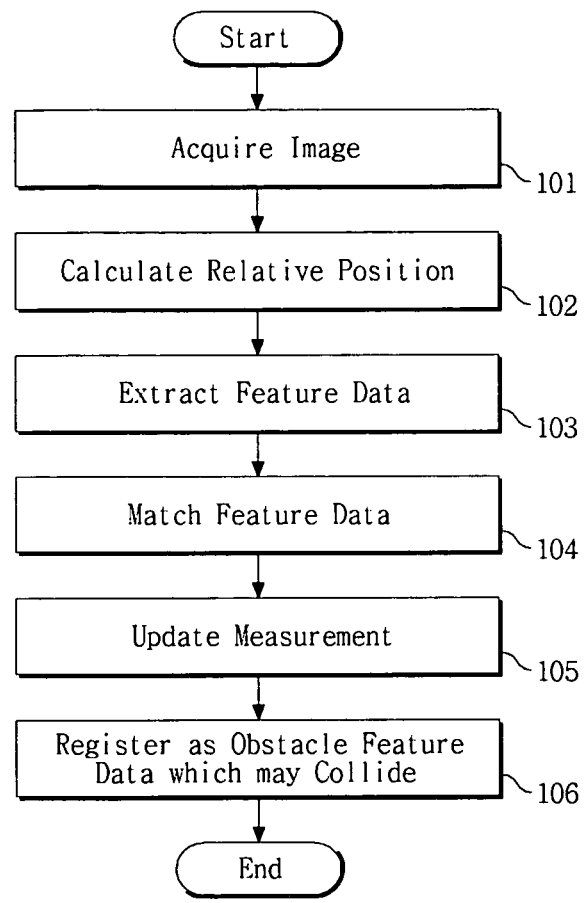
FIG. 6 is a flow chart of a SLAM method of a robot according to an exemplary embodiment of the present invention.

FIG. 6 is a flow chart of a SLAM method of a robot according to an exemplary embodiment of the present invention.

In operation 101, an image is acquired which a robot takes while traveling around a work space. For instance, the image may be acquired using the camera 101.

In operation 102, a relative position of the robot is calculated. For example, the relative position estimator 104 may calculate a difference between a previous position and a current position and a change in direction of the robot.

In operation 103, feature data is extracted from the image. For example, the feature data extractor 102 may extract from the image a feature point, such as a corner, or a feature line, such as an edge.

In operation 104, a matching process is performed between the extracted feature data and registered feature data. For example, the absolute position estimator 105 may compare the extracted feature data with the registered feature data. In a case of unsuccessful matching, the extracted feature data may be stored as new feature data, or feature data may be extracted from a reacquired image.

In a case of successful matching, measurement update is performed in operation 105. The measurement update may be a process where the absolute position estimator 105 updates the registered feature data and calculates absolute positions of the robot and the feature data.

In operation 106, feature data which may collide is registered as an obstacle.

Figure 7:
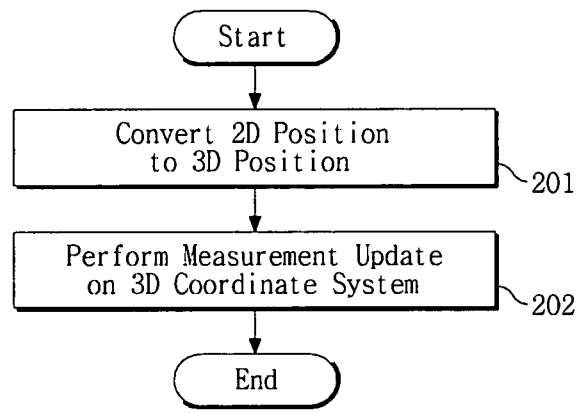
FIG. 7 is a flow chart of a measurement update process according to an exemplary embodiment of the present invention.

The measurement update, i.e., the operation 105 will be described in detail with reference to FIG. 7.

In operation 201, the 2D position of the extracted feature data is converted to a 3D position. For example, the converter 201 may convert the 2D coordinate in the image coordinate system to the 3D coordinate in the camera coordinate system.

As described above, insufficient data upon the conversion process may be supplemented through an appropriate assumption. For instance, depth data is set to a certain value, and an error covariance in the depth direction is set to infinity. If the feature data is a feature line, an error covariance in the direction parallel to the feature line may also be set to infinity.

In operation 202, the measurement update is performed in the converted 3D coordinate system. For example, the updater 202 may update the registered feature data by comparing the extracted feature data with the registered feature data in the camera coordinate system.

As apparent from the above description, since the measurement update of SLAM is performed in the 3D coordinate system, it is possible to reduce non-linear components contained in the calculation process and to improve the SLAM performance.

A number of exemplary embodiments have been described above. Nevertheless, it will be understood that embodiments equally include the same with various modifications. For example, suitable results may be achieved if the described techniques are performed in a different order and/or if components in a described system, architecture, module, or circuit are combined in a different manner and/or replaced or supplemented by other components or their equivalents.

Thus, while aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Accordingly, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A simultaneous localization and mapping (SLAM) apparatus of a robot, comprising:
 a converter to convert a two-dimensional (2D) position of measured feature data in a first coordinate system to a three-dimensional (3D) position in a second coordinate system based on a preset depth of the measured feature data, the depth of the measured feature data having been preset to a predetermined value; and an updater to update pre-existing registered feature data in a third coordinate system and corresponding to the measured feature data, by converting the registered feature data from the third coordinate system to the second coordinate system and comparing, in the second coordinate system, the converted 3D position of the measured feature data with a corresponding 3D position of the converted registered feature data.

2. The SLAM apparatus of claim 1, wherein the converter converts the 2D position of the measured feature data to a 3D position in a camera coordinate system of a camera for acquiring the measured feature data.

3. A simultaneous localization and mapping (SLAM) apparatus of a robot, comprising:

a converter to convert a two-dimensional (2D) position of measured feature data in an image coordinate system to a three-dimensional (3D) position in a camera coordinate system based on a preset depth of the measured feature data, the depth of the measured feature data having been preset to a predetermined value; and an updater to update registered feature data in a world coordinate system by converting the registered feature data from the world coordinate system to the camera coordinate system and comparing, in the camera coordinate system, the converted 3D position of the measured feature data with a 3D position of the converted registered feature data, wherein the updater updates the registered feature data in the camera coordinate system of a camera for acquiring the measured feature data.

4. The SLAM apparatus of claim 1, wherein the converting is based on the measured feature data being a single feature point.

5. A simultaneous localization and mapping (SLAM) apparatus of a robot, comprising:

a converter to convert a two-dimensional (2D) position of measured feature data in a first coordinate system to a three-dimensional (3D) position in a second coordinate system; and an updater to update pre-existing registered feature data in a third coordinate system and corresponding to the measured feature data, by converting the registered feature data from the third coordinate system to the second coordinate system and comparing, in the second coordinate system, the converted 3D position of the measured feature data with a corresponding 3D position of the converted registered feature data, wherein the feature data is a feature point, and wherein, in the converting of the 2D position to the 3D position, the converter sets a depth of the feature point to a predetermined value and sets an error covariance in the depth direction to infinity.

6. The SLAM apparatus of claim 1, wherein the converting is based on the measured feature data being a single feature line, and a position of the feature line is defined to be a 2D position of both defined end points of the feature line.

7. The SLAM apparatus of claim 6, wherein, in the converting of the 2D position to the 3D position, the converter presets the depth of the measured feature data to the predetermined value by presetting a depth of each end point to respective predetermined values and the converter sets an error covariance in the depth direction and an error covariance in a direction parallel to the feature line to infinity, such that the converting is then based on the set depths and error covariances.

8. A simultaneous localization and mapping (SLAM) method of a robot, comprising:

converting a two-dimensional (2D) position of measured feature data in a first coordinate system to a three-dimensional (3D) position in a second coordinate system based on a preset depth of the measured feature data, the depth of the measured feature data having been preset to a predetermined value; and updating, using at least one processing device, pre-existing registered feature data in a third coordinate system and corresponding to the measured feature data, by converting the registered feature data from the third coordinate system to the second coordinate system and comparing, in the second coordinate system, the converted 3D position of the measured feature data with a corresponding 3D position of the converted registered feature data.

9. The SLAM method of claim 8, wherein the 2D position of the measured feature data is converted to a 3D position in a camera coordinate system of a camera for acquiring the measured feature data.

10. The SLAM method of claim 8, wherein updating is performed in a camera coordinate system of a camera for acquiring the measured feature data.

11. The SLAM method of claim 8, wherein the converting is based on the measured feature data being a single feature point.

12. The SLAM method of claim 11, wherein the converting further comprises setting an error covariance in the depth direction to infinity when converting the 2D position to the 3D position, such that the converting is then based on the set depth and error covariance.

13. The SLAM method of claim 8, wherein the converting is based on the measured feature data being a single feature line, and a position of the feature line is defined to be a 2D position of both defined end points of the feature line.

14. The SLAM method of claim 13, wherein the converting further comprises:

presetting the depth of the measured feature data to the predetermined value by presetting a depth of each end point to respective predetermined values; and setting an error covariance in the depth direction and an error covariance in a direction parallel to the feature line to infinity when converting the 2D position to the 3D position, wherein the converting is then based on the set depths and error covariances.

15. The SLAM apparatus of claim 4, wherein, in the converting of the 2D position to the 3D position, the converter sets an error covariance in the depth direction to infinity, such that the converting is then based on the set depth and error covariance.

* * * * *